US009191914B2

(12) United States Patent
Kennedy et al.

(10) Patent No.: US 9,191,914 B2
(45) Date of Patent: Nov. 17, 2015

(54) ACTIVATING DEVICES BASED ON USER LOCATION

(71) Applicant: Comcast Cable Communications, LLC, Philadelphia, PA (US)

(72) Inventors: Christopher Kennedy, Highlands Ranch, CO (US); David Andrew Ohare, Greenwood Village, CO (US); Michelle Tomes, Aurora, CO (US); Paolo Barolat-Romana, Philadelphia, PA (US); Richard Vetter, Lansdowne, PA (US); Manoj Chaudhari, Dayton, NJ (US); Thiru Srinivasan, Highlands Ranch, CO (US); Nicholas Adam Pinckernell, Littleton, CO (US); Jonathan Alan Leech, Denver, CO (US); Edward David Monnerat, Parker, CO (US); Mehul Patel, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/151,448

(22) Filed: Jan. 9, 2014

(65) Prior Publication Data

US 2014/0274147 A1    Sep. 18, 2014

Related U.S. Application Data

(60) Provisional application No. 61/786,680, filed on Mar. 15, 2013.

(51) Int. Cl.
*H04W 64/00* (2009.01)

(52) U.S. Cl.
CPC .................................... *H04W 64/00* (2013.01)

(58) Field of Classification Search
CPC ...................................................... H04W 64/00
See application file for complete search history.

(56) References Cited

U.S. PATENT DOCUMENTS

| 8,884,736 B1* | 11/2014 | Gravino et al. | 340/4.31 |
| 2006/0088149 A1* | 4/2006 | Sung | 379/142.16 |
| 2012/0060176 A1* | 3/2012 | Chai et al. | 725/10 |

* cited by examiner

*Primary Examiner* — Kashif Siddiqui
(74) *Attorney, Agent, or Firm* — Ballard Spahr LLP

(57) ABSTRACT

System and methods for providing a user experience are described, including a method comprising determining a location of a user and automatically selecting an interface device of a plurality of interface devices based upon the location of a user. The selected interface device can be configured to transmit audio, transmit video, receive audio, receive video, or a combination thereof. The method can also comprise automatically configuring a user experience provided via the selected interface device.

20 Claims, 7 Drawing Sheets

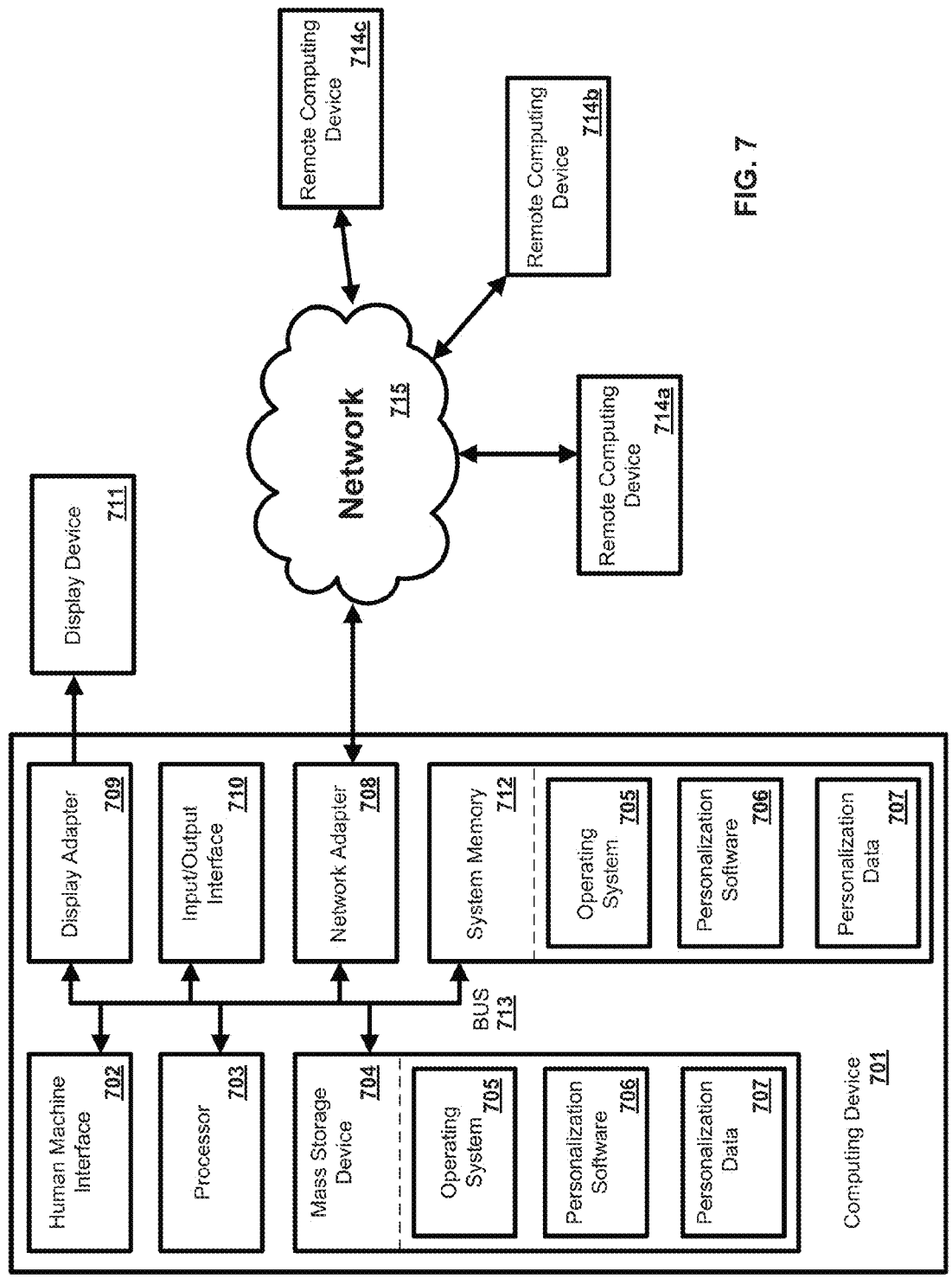

ACTIVATING DEVICES BASED ON USER LOCATION

CROSS REFERENCE TO RELATED PATENT APPLICATION

This application claims priority to U.S. Patent Application No. 61/786,680 filed Mar. 15, 2013, herein incorporated by reference in its entirety.

BACKGROUND

Users can often change locations while interacting with one or more devices. For example, users can use a wireless device to communicate with a network (e.g., cellular network, Wi-Fi network, local area network, Internet, etc.), while changing location. As an example, users can move from room-to-room in a premises and can control playback (e.g., start and stop) of content assets, such as video, using multiple playback devices. However, such playback control requires manual manipulation of one or more remote controls by the user. Additionally, network connectivity can be affected by changing location. Furthermore, battery charge of a wireless device can be diminished as a result of changing location. These and other shortcomings of the prior art are addressed by the present disclosure.

SUMMARY

It is to be understood that both the following summary and the following detailed description are exemplary and explanatory only and are not restrictive, as claimed. In an aspect, provided are methods and systems for automatically personalizing a user experience based upon a user location. The systems and methods provided can enable, for example, a device or system to recognize the presence of a specific user and then adjust various parameters that define a user experience. As another example, one or more interface devices can be automatically activated based upon a location of a user.

In an aspect, methods can comprise determining a location of a user. An interface device of a plurality of interface devices can be selected based upon the location of a user. The selected interface device can be configured to transmit audio, video, and/or other data, and receive audio, video, and/or data, or a combination thereof. Communication information can be automatically routed to the selected interface device.

In an aspect, a system and network can comprise a plurality of interface devices, wherein one or more of the plurality of interface devices is configured to transmit audio, transmit video, receive audio, receive video, or a combination thereof. The system and network can also comprise a gateway in communication with the plurality of interface devices and a network, wherein the gateway is configured to facilitate a communication session between the network and one or more of the interface devices. The gateway can also be configured to receive information (e.g., monitor information) relating to one or more of the plurality of interface devices and to determine a select interface device of the plurality of interface devices based upon the monitor information. The system and network can further comprise a controller in communication with one or more of the plurality of interface devices and the gateway to activate a communication session between the network and the select interface device of the plurality of interface devices.

In an aspect, methods can comprise receiving a request for a communication session. A user location can be determined based on the request. A select interface device of a plurality of interface devices can be determined based upon the user location, wherein one or more of the plurality of interface devices is to transmit audio, video, and/or other data, and receive audio, video, and/or data, or a combination thereof. The communication session between the select interface device and a network can then be activated.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 is a block diagram of an exemplary computing device.

DETAILED DESCRIPTION

Figure 1:
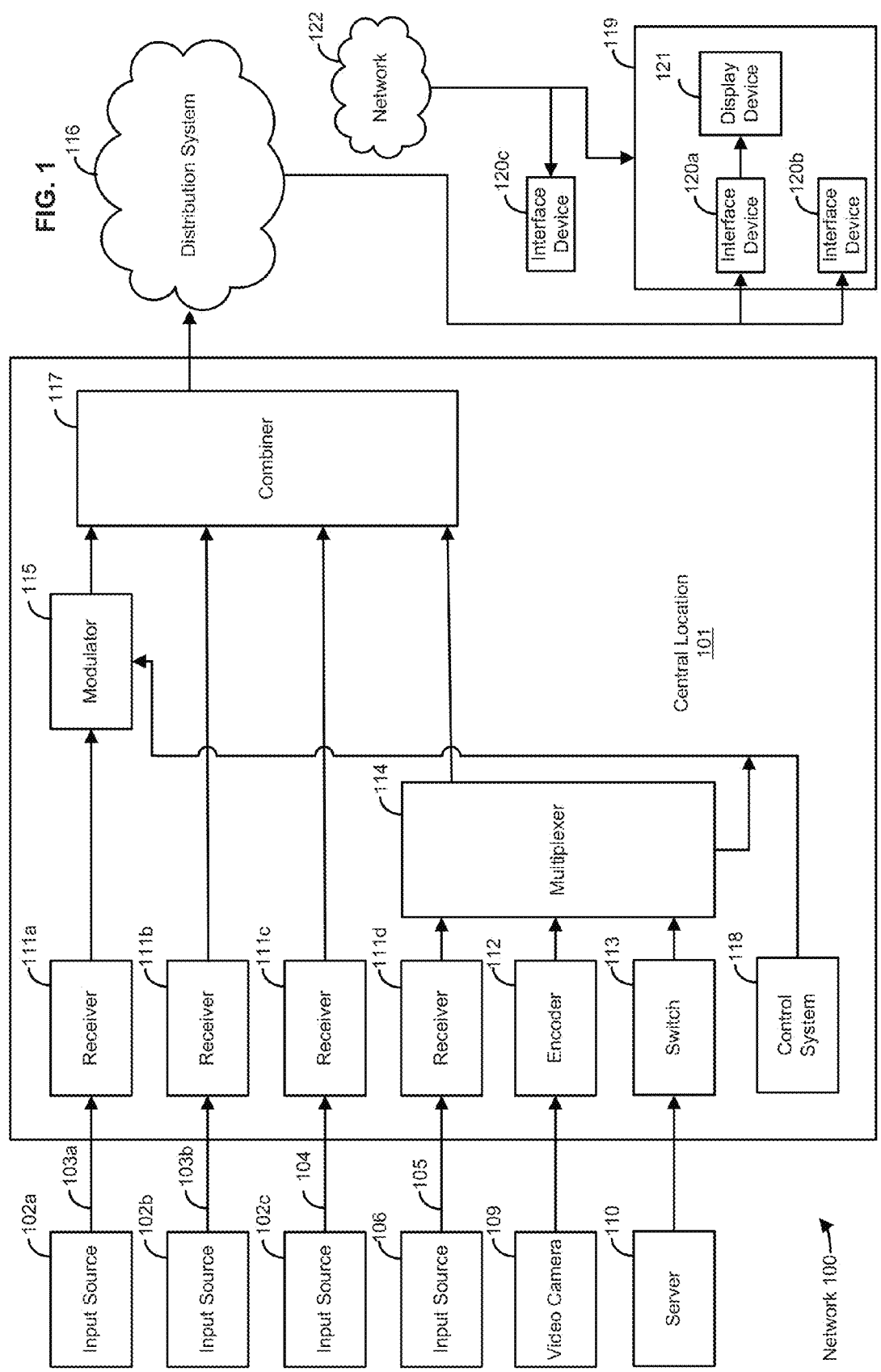
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, systems and methods are provided for automatically personalizing a user experience based upon a user location. The systems and methods provided can enable, for example, a device or system to recognize the presence of a specific user and then adjust various parameters that define a user experience. As another example, one or more interface devices can be automatically activated based upon a location of a user. In an aspect, interface devices such as displays, user devices, telephones, decoders, communication terminals, and the like can be selectively activated based on a location of a user. As the user moves, various interfaces devices can automatically be deactivated and/or activated based upon a detected proximity to the user.

FIG. 1 illustrates various aspects of an exemplary network environment in which the present methods and systems can operate. The present disclosure relates to methods and systems for automatically personalizing a user experience based on user location. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial (e.g., fiber optic, coaxial path 104). The central location 101 can also receive content from a direct feed source 106 via a direct line 105. Content may also be created at the central location 101. Other input sources can comprise capture devices such as a video camera 109 or a server 110. The signals provided by the content sources can include, for example, a single content item or a multiplex that includes several content items.

The central location 101 can comprise one or a plurality of receivers 111a, 111b, 111c, 111d that are each associated with an input source. In an aspect, the central location 101 can create and/or receive applications, such as interactive application, for example. For example, MPEG encoders such as encoder 112, are included for encoding local content or a video camera 109 feed. A switch 113 can provide access to server 110, which can be, for example, a pay-per-view server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. In an aspect, the distribution system 116 can be in communication with an advertisement system for integrating and/or delivering advertisements to user locations. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116.

In an aspect, one or more interface devices 120*a*, 120*b*, 120*c* can comprise a decoder, a gateway, a communications terminal (CT), an audio terminal, or a mobile user device that can decode, if needed, the signals for display on a display device 121, such as a television, mobile device, a computer monitor, or the like. The display device 121 can be integrated with one or more of the interface devices 120*a*, 120*b*, 120*c*. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more interface devices 120*a*, 120*b*, 120*c*, display devices 121, central locations 101. DVR's, home theater PC's, and the like. The in interface devices 120*a*, 120*b*, 120*c* can be located at the user location or disposed elsewhere.

In an aspect, user location 119 is not fixed. By way of example, a user can receive content from the distribution system 116 on a mobile device such as a laptop computer, PDA, smart phone, GPS, vehicle entertainment system, portable media player, and the like.

In an aspect, the interface devices 120*a*, 120*b*, 120*c* can receive signals from the distribution system 116 for rendering content such as video, audio, images, text, and the like via the interface devices 120*a*, 120*b*, 120*c*. As an example, rendering content can comprise providing audio and/or video, displaying images, facilitating an audio or visual feedback, tactile feedback, and the like. However, other content can be rendered via the interface devices 120*a*, 120*b*, 120*c* such as an interactive communication session (e.g., Voice over IP, telephone, video conference, etc.). In an aspect, the interface devices 120*a*, 120*b*, 120*c* can be an CT, a set-top box, a television, a computer, a smart phone, a laptop, a tablet, a multimedia playback device, a portable electronic device, and the like. As an example, the interface devices 120*a*, 120*b*, 120*c* can be an Internet protocol compatible device for receiving signals via a network 122 such as the Internet or some other communications network for providing content to the user. As a further example, other display devices and networks can be used. In an aspect, the interface devices 120*a*, 120*b*, 120*c* can be a widget or a virtual device for displaying content in a picture-in-picture environment such as on the display device 121, for example.

In an aspect, one or more of the interface devices 120*a*, 120*b*, 120*c* can be configured as a communication terminal for conducting two-way communications via a communications network such as a cellular network, telephone network, IP network, and the like. As an example, the interface devices 120*a*, 120*b*, 120*c* can be configured to transmit and/or receive communications such as voice, audio, video, text, and the like. As another example, the interface devices 120*a*, 120*b*, 120*c* can be configured to determine (e.g., calculate, detect, receive) a user location. As a further example, the interface devices 120*a*, 120*b*, 120*c* can be selectively connected to a network via a gateway or switch.

Figure 2A:
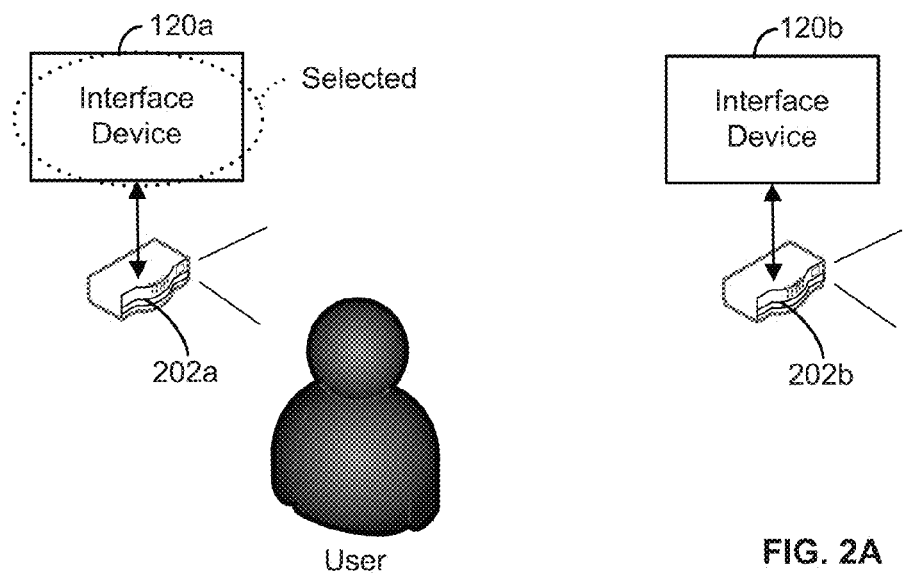
FIG. 2A is a block diagram of an exemplary system.
Figure 2B:
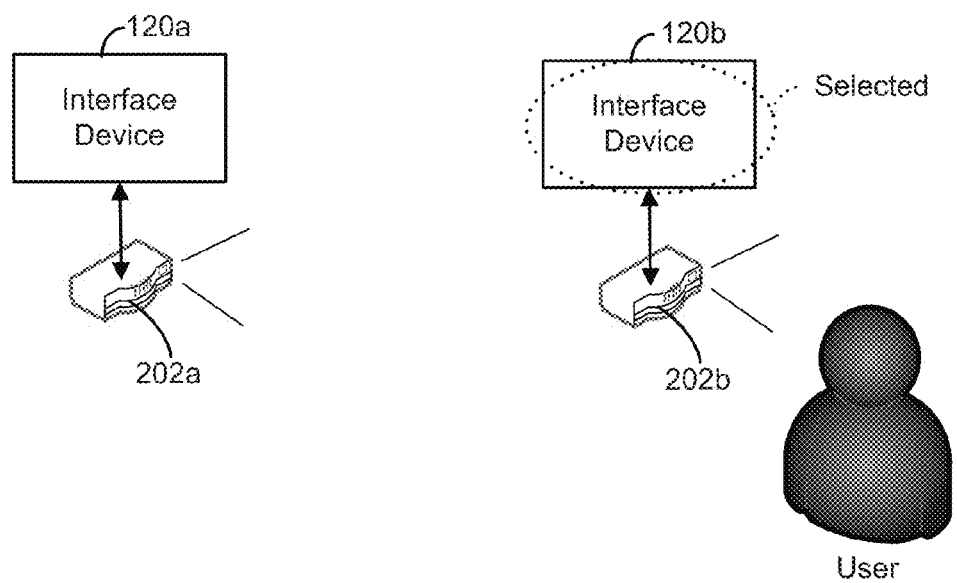
FIG. 2B is a block diagram of an exemplary system.
Figure 2C:
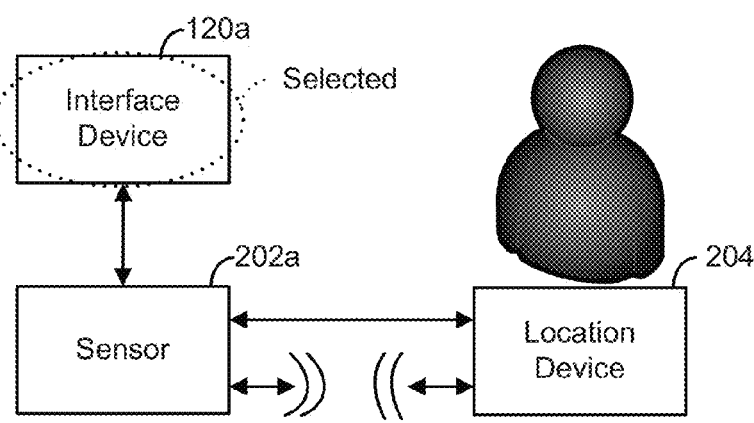
FIG. 2C is a block diagram of an exemplary system.

FIGS. 2A-2C illustrates various aspects of an exemplary network and system in which some of the disclosed methods and systems can operate. In an aspect, one or more sensors 202*a*, 202*b* (or a combination of multiple sensors) can be configured to determine (e.g., capture, retrieve, sense, measure, detect, extract, or the like) information relating to one or more users. As an example, the sensors 202*a*, 202*b* can be configured to determine the presence of one or more users within a field of view of the sensors 202*a*, 202*b*. A field of view can be based on sensor input such as motion input, heat input, optical input, audio input, signal strength, quality of service (QOS), proximity, and the like. Field of view can comprise an operational range of the one or more sensors 202*a*, 202*b* that is not limited to a direct line of sight. As a further example, the sensors 202*a*, 202*b* can be configured to determine a user state, such as behavior, biometrics, movement, physical and or chemical characteristics, location, reaction, and other characteristics relating to one or more users. Other characteristics, identifiers, and features can be detected and/or monitored by the sensors 202*a*, 202*b*, such as gestures, sounds (e.g., voice, laughter), and environmental conditions (e.g., temperature, time of day, date, lighting, and the like).

In an aspect, the sensors 202*a*, 202*b* can comprise one or more of a camera, stereoscopic camera, wide-angle camera, visual sensor, thermal sensor, infrared sensor, biometric sensor, user tracking device, RF sensor, Bluetooth, near field, audio sensor, sound sensor, proximity sensor, haptic sensor, time sensor, and/or any other device for determining a user state or condition. In an aspect, the sensors 202*a*, 202*b* can be configured for one or more of facial recognition, gesture recognition, body heat analysis, behavioral analysis, eye tracking, head tracking, biometric, QoS, signal strength detection, analysis and/or other means of determining a user characteristic, a signal characteristic relating to a user, and or a change in a characteristic. As an example, the sensors 202*a*, 202*b* can comprise software, hardware, algorithms, processor executable instructions, and the like to enable the sensors 202*a*, 202*b* to process any data captured or retrieved by the sensors 202*a*, 202*b*. As a further example, the sensors 202*a*, 202*b* can transmit data captured or retrieved thereby to a device or system in communication with the sensors 202*a*, 202*b*, such as a processor, server, one or more interface device 102*a*, 102*b*, or the like.

In an aspect, the sensors 202*a*, 202*b* can be in communication with one or more of the interface devices 120*a*, 120*b*. However, the interface devices 120*a*, 120*b* can receive data indirectly from the sensors 202*a*, 202*b*, such as via a processor, a server, an agent, a control device, or the like. As an example, the sensors 202*a*, 202*b* can be disposed within a pre-determined proximity of the interface devices 120*a*, 120*b* to determine information relating to one or more users within the pre-determined proximity of the interface devices 120*a*, 120*b*. Accordingly, the interface devices 120*a*, 120*b* can be configured to personalize a user experience being rendered thereby in response to data received from the sensors 202*a*, 202*b* and based upon determined characteristics of the one or more users within the pre-determined proximity of the interface devices 120*a*, 120*b*. However, the sensors 202*a*, 202*b* can be disposed in any location relative to the interface devices 120*a*, 120*b*.

As shown in FIG. 2A, when a user is within the field, e.g., field of view of the sensor 202*a*, data relating to the presence and/or user state of the user can be communicated to the associated interface devices 120*a*. Accordingly, the interface device 120*a* can be automatically selected (e.g., activated, enabled, energized, etc.). As an example, content can be presented via the select interface devices 102*a*. As the user moves out of the field of the sensor 202*a* and into the field of the sensor 202*b*, the interface device 120*b* associated with sensor 202*b* can be automatically selected, as illustrated in FIG. 2B. In an aspect, when a user moves out of a field on one or more of the sensors 202*a*, 202*b*, the associated interface device 120*a*, 120*b*, can be deselected.

In an aspect, a user can be detected concurrently by a plurality of sensors 202*a*, 202*b*. As an example, information received or accessed by two or more of the plurality of sensors 202*a*, 202*b* can be compared in order to determine the interface device to select. As another example, two or more sensors 202*a*, 202*b* can receive an audio signal from a user or device co-located (e.g., in proximity to the user or held/carried by the user) with the user. As such, the QoS, best network characteristics such as bandwidth, or audio level of the received audio at each of the two or more sensors 202*a*, 202*b* can be compared and the sensor 202*a*, 202*b* receiving the best QoS or highest audio level can be selected. Accordingly, the interface device associated with the selected one of the sensors 202*a*, 202*b* can be automatically activated.

In an aspect, a location device 204 can be associated with a particular user, as illustrated in FIG. 2C. The location device 204 can comprise a transmitter and/or receiver. As an example, the location device 204 can transmit a signal that can be detected by one or more sensors, such as sensor 202*a*. When the sensor 202*a* detects the signal transmitted by the location device 204, the interface device 120*a* associated with the sensor 202*a* detecting the signal can be automatically selected.

As another example, two or more sensors 202*a*, 202*b* can detect a wireless signal from a user or device (e.g., location device 204) co-located with the user. As such, the QoS or signal level of the received wireless signal at each of the two or more sensors 202*a*, 202*b* can be compared and the sensor 202*a*, 202*b* receiving the best QoS or highest signal level can be selected. Accordingly, the interface device associated with the selected one of the sensors 202*a*, 202*b* can be automatically activated.

Figure 3:
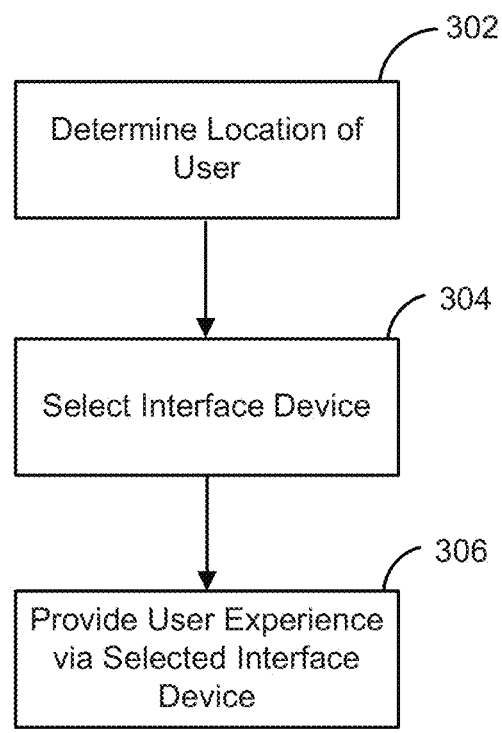
FIG. 3 is a flow chart of an exemplary method.

FIG. 3 illustrates an exemplary method for providing and controlling a user experience. In step 302, a location of one or more users can be determined. In an aspect, sensors can receive or access information (e.g., user data) relating to one or more users within the field of view of the sensor. As an example, the location of one or more users can be determined by relative proximity to a sensor. As such, when a sensor detects a user's presence, it can be assumed that the user is located within proximity of the detecting sensor. As a further example, the user data can be processed to determine an identity of one or more of the users within the field of view of the sensor 202, such as by facial recognition, gesture recognition, body heat analysis, behavioral analysis, eye tracking, head tracking, biometric analysis and/or other means of determining a user characteristic and or a change in a user characteristic. Other techniques can be used to identify a user or users, including direct user query and/or user input. As a further example, the user data can be compared to stored data in order to determine an identity of one or more of the users within the field of view of the sensor. In another aspect, characteristics and/or behavior of one or more users can be determined, such as by using the sensor. As an example, the user data can be processed to determine a user state, user characteristic and/or behavior of one or more of the users within the field of view of the sensor, such as by facial recognition, gesture recognition, body heat analysis, behavioral analysis, eye tracking, head tracking, biometric analysis and/or other means of determining a user characteristic and or a change in a user characteristic. In an aspect, the user characteristics, user state and/or user behavior determined can be used to generate and/or update one or more of the user profiles.

In step 304, an interface device can be selected based upon the determined location of the one or more users. In an aspect, when a user is within the field, e.g., field of view of the sensor, data relating to the presence and/or user state of the user can be communicated to the associated interface devices. Accordingly, the interface device can be automatically selected (e.g., activated, enabled, energized, etc.). As the user moves out of the field of a first sensor and into the field of a second sensor, the interface device associated with the second sensor can be automatically selected. In an aspect, a user can be detected by a plurality of sensors. As an example, information received or accessed by two or more of the plurality of sensors can be compared in order to determine the interface device to select. As a further example, two or more interface devices can be selected. As such, the interfaces can independently and/or jointly serve as an interface for the user.

In step 306, a user experience can be provided via the selected interface device (e.g., via the interface device itself or a device in communication with the interface device). In an aspect, the user experience can comprise a visual and/or audible content for user consumption. As an example, the user experience can comprise environmental characteristics such as lighting, security settings, temperature, tactile feedback, and/or other sensory feedbacks. As a further example, the user experience can comprise a communication session such as a communication over a telephone network, a cellular network, the Internet, or the like.

In an aspect, an audio output can be modified based on a location of a user. As an example, when the user moves from the family room into the kitchen, the audio feedback can be routed to interface devices (e.g., speakers and/or displays, which may be part of the interface device or in communication with the interface device) located in the kitchen. Likewise, when the user returns from the kitchen and enters the family room, the audio output can be returned to an interface device in the family room. As another example, audio levels of an audio output can be modified based on a parameter such as a user location.

In an aspect, audio output can be directed to a specific location of a user within a given room. For example, when a user moves from one end of the room to the opposite end of the room, the audio output can be configured to follow the user across the room by varying the particular level of a plurality of interface devices.

In an aspect, video (e.g., streaming video, video on demand, recorded video, advertisements, cable video feed, etc.) can be rerouted based on a location of a user. As an example, when the user moves from the family room into the kitchen, a content signal can be routed to an interface device (e.g., television) located in the kitchen. Likewise, when the user returns from the kitchen and enters the family room, the content signal can be returned to an interface device in the family room. As a further example, when the user moves from the family room into the kitchen, a content being presented in the family room can be paused or routed to an interface device (e.g., television) located in the kitchen. However, in certain aspects, when the content comprises an advertisement, the advertisement can continue to be presented in the family room, while the user is out of the room.

In an aspect, video can be directed to a specific location of a user within a given room. For example, when a user moves from one end of the room to the opposite end of the room, the video can be configured to follow the user across the room by varying the selected video output device from a plurality of interface devices.

In an aspect, a communication session can be configured based upon a location of a user. As an example, a communication session can be established between an interface device in a home office of a user premises and a communications network such as a cellular network, IP network, telephone network, and the like. As a further example, the user can move from the home office into a living room of the premises. As such, the location of the user can be determined and the established communication session can be reconfigured to connect an interface device in the living room to the communications network.

In an aspect, a system for rendering a user experience can be configured to automatically detect one or more users and personalize content based upon a location of one or more users. As an example, a centralized gateway can be configured to control the selection of one or more interface devices based on a user's location and the personalization of the user experience.

Figure 4:
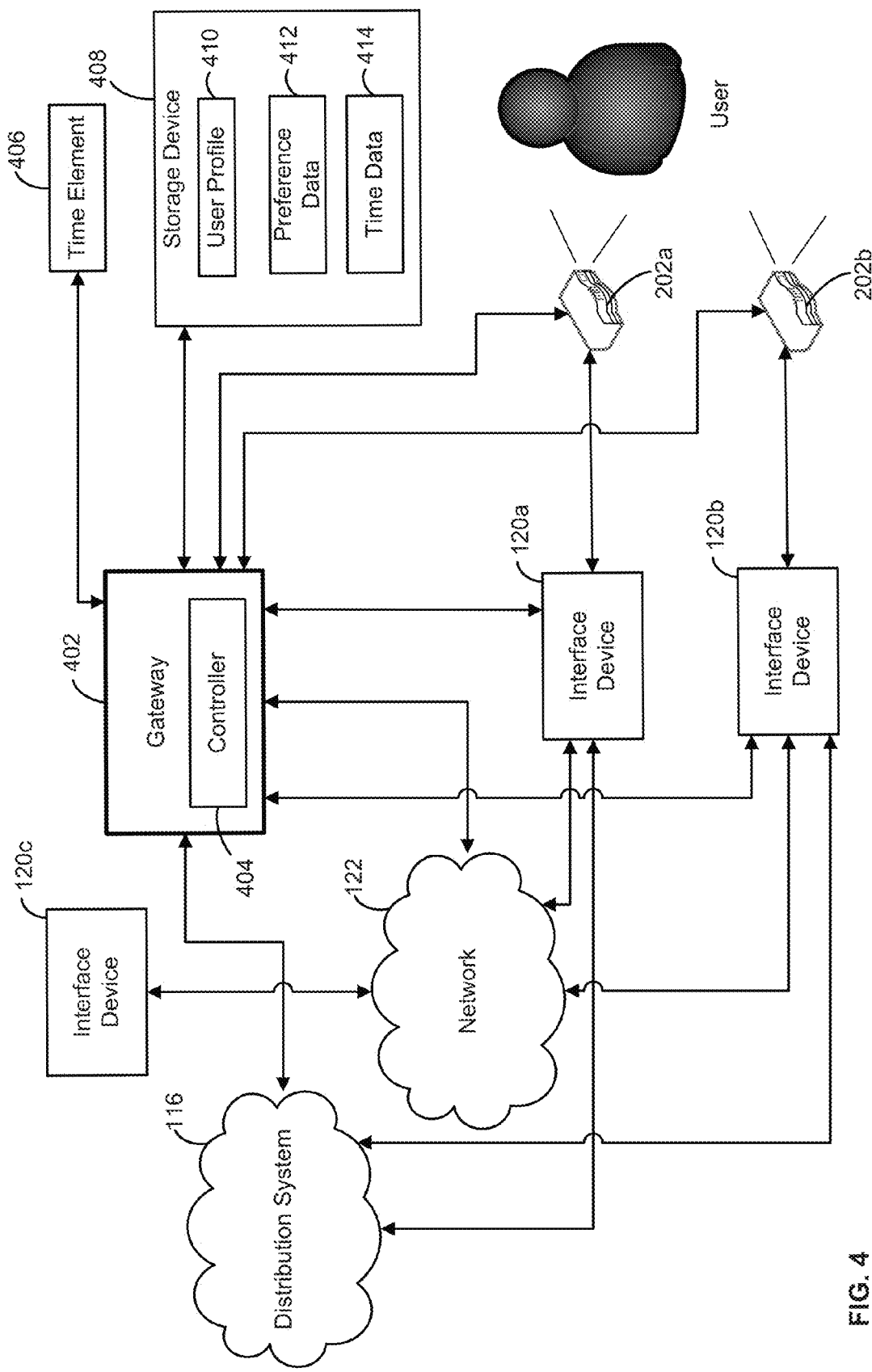
FIG. 4 is a block diagram of an exemplary method.

FIG. 4 illustrates various aspects of an exemplary network and system in which the present methods and systems can operate. In an aspect, the sensors 202a, 202b can be configured to determine (e.g., capture, sense, measure, detect, extract, or the like) information relating to one or more users. As an example, the sensors 202a, 202b can be configured to determine the presence of one or more users within a field of view of the sensors 202a, 202b. As a further example, the sensors 202a, 202b can be configured to determine a user state, such as a behavior, biometrics, movement, physical and or chemical characteristics, location, reaction, and other characteristics relating to one or more users. In an aspect, the user state can comprise discrete classifications such as: "present," where the user can consume the delivered content; "not present," where the user is not in a position to consume the delivered content; "sleeping," where the user's eyes are detected to be closed for a pre-determined threshold time period; and "not engaged," where the user is "present," however, detected gestures, characteristics and/or behavior indicate that the user is distracted from the delivered content. As an example, the user states can be classified in any manner and based upon any techniques or rules.

In an aspect, the sensors 202a, 202b can be in communication with a gateway 402 for receiving the user state data from the sensors 202a, 202b to control the user experience provided by one or more of the interface devices 120a, 120b in response to the user state. In an aspect, when the user leaves the room for a predetermined or user specific period of time, the interface devices 120a, 120b can be caused to enter an "off" state or "hibernate" state, thereby conserving energy. As an example, when a user falls asleep, the interface devices 120a, 120b can be placed into a sleep state. Conversely, when a sleeping user awakens, interface devices 120a, 120b can be caused to exit a sleep state. As a further example, the user places the control device in its docking station, signaling an off state for all of the other devices in communication with the control device. Other device control and content control can be executed by the gateway 402.

In an aspect, the gateway 402 can be in communication with one or more of the distribution system 116, interface devices 120a, 120b, the Internet, and/or a communication network to receive information relating to content being delivered to a particular user. As an example, the gateway 402 can comprise software, virtual elements, computing devices, router devices, and the like to facilitate communication and processing of data. In an aspect, the gateway 402 can be disposed remotely from the user location. However, the gateway 402 can be disposed anywhere, including at the user location to reduce network latency, for example.

In an aspect, the gateway 402 can be configured to receive and process user data from the sensors 202a, 202b to determine a user presence and/or a user state based upon the data received from the sensors 202a, 202b. As an example, the gateway 402 can be configured for one or more of facial recognition, gesture recognition, body heat analysis, behavioral analysis, eye tracking, head tracking, biometric analysis and/or other means of determining a user characteristic and or a change in a user characteristic. As an example, the sensors 202a, 202b can comprise software, hardware, algorithms, processor executable instructions, and the like to enable the sensors 202a, 202b to process any data captured or retrieved by the sensors 202a, 202b.

In an aspect, the gateway 402 can be configured to route information and/or to reconfigure connections between one or more interface devices 120a, 120b and one or more networks. Routing and reconfiguration can be implemented by software or hardware such as a controller 404 (e.g., router, server, switch, etc.). As an example, the gateway 402 can be configured to establish a communication session with one or more interface devices 120a, 120b. As another example, a communication session can be established between one or more interface devices 120a, 120b at a first location and another interface device 102c at a second location. As a further example, a communication session can be established via a network, such as a cellular network. IP network, wireless network, telephone network, and the like. In another aspect, a communication session can be configured based upon a location of a user. As an example, a communication session can be established between an interface device in a home office of a user premises and a communications network, such as a cellular network, IP network, telephone network, and the like. As a further example, the user can move from the home office into a living room of the premises. As such, the location of the user can be determined and the established communication session can be reconfigured to connect an interface device in the living room to the communications network.

In an aspect, a time element 406 can be in communication with at least the gateway 402 to provide a timing reference thereto (e.g., timing references to timing/scheduling data in other content such as advertisements or other related content). As an example, the time element 406 can be a clock. As a further example, the time element 406 can transmit information to the gateway 402 for associating a time stamp with a particular event or user data received by the gateway 402. In an aspect, the gateway 402 can cooperate with the time element 406 to associate a time stamp with events having an effect on content delivered to the interface devices 120a, 120b, such as, for example, an incoming call, an outgoing call, a channel tune, a remote tune, remote control events, playpoint audits, playback events, program events including a program start time and/or end time and/or a commercial/intermission time, and/or playlist timing events, and the like. In an aspect, the gateway 402 can cooperate with the time element 406 to associate a time stamp with user events, such as a registered or learned schedule of a particular user. For example, if a particular user listens to classical music during weekday evenings and watches sports during the weekends, the gateway 402 can automatically control content presented to the user based upon a registered or learned schedule of the user's habits or preferences.

In an aspect, a storage media or storage device 408 can be in communication with the gateway 402 to allow the gateway 402 to store and/or retrieve data to/from the storage device 408 As an example, the storage device 408 can store information relating to user profiles 410, user preference data 412, time data 414, device configurations, and the like. In an aspect, the storage device 408 can be a single storage device or may be multiple storage devices. As an example, the storage device 408 can be a solid state storage system, a magnetic storage system, an optical storage system or any other suitable storage system or device. Other storage devices can be used and any information can be stored and retrieved to/from the storage device 408 and/or other storage devices.

In an aspect, each of a plurality of user profiles 410 can be associated with a particular user. As an example, the user profiles 410 can comprise user identification information to distinguish one user profile 410 from another user profile 410. As a further example, the user profiles 410 can comprise user preference data 412 based upon one or more of user preferences, user permissions, user behavior, user characteristics, user reactions, and user-provided input.

In an aspect, the user preference data 412 can comprise information relating to the preferred user experience settings for a particular user. As an example, user preference data 412 can comprise preferred image, video, and audio content that can be provided directly by a user or can be learned based upon user behavior or interactions. As a further example, user preference data 412 can comprise preferred content settings (e.g., genre, ratings, parental blocks, subtitles, version of content such as director's cut, extended cut or alternate endings, time schedule, permission, and the like), environmental settings (e.g., temperature, lighting, tactile feedback, and the like), and presentation settings (e.g., volume, picture settings such a brightness and color, playback language, closed captioning, playback speed, picture-in-picture, split display, and the like), which can be provided by a user or learned from user habits and/or behavior. Other settings, preferences, and/or permission can be stored and/or processed as the user preference data 412.

In an aspect, time data 414 can be associated with a particular user profile 410 for defining a temporal schedule. As an example, a user associated with one of the user profiles 410 may habitually watch football in the basement on Sunday afternoons. As another example, a user may receive incoming calls via a communication terminal in a home office during work hours, but prefer to receive incoming calls via a communications terminal in the kitchen after work hours. Accordingly, the timing data 414 can represent the learned content consumption pattern from the user and can apply such preferences to similar events in time and context, thereby personalizing the user experience without direct user interaction.

Figure 5:
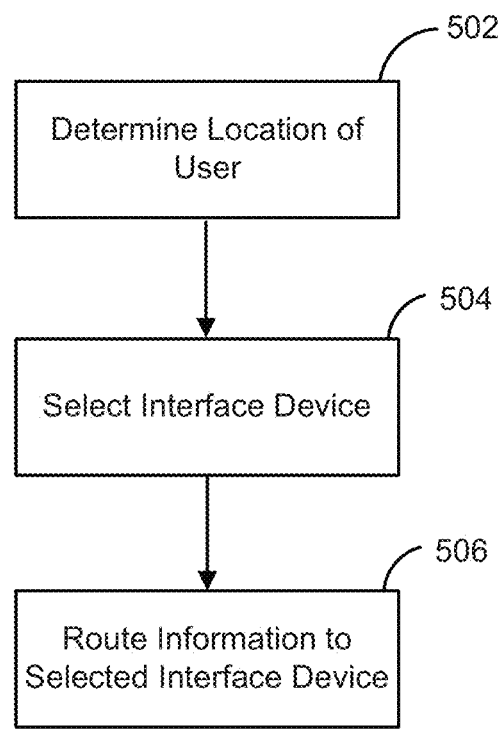
FIG. 5 is a flow chart of an exemplary system.

FIG. 5 illustrates an exemplary method for providing and controlling a user experience. In step 502, a location of one or more users can be determined. In an aspect, sensors can receive or access information (e.g., user data) relating to one or more users within the field of view of the sensor. As an example, location of one or more users can be determined by relative proximity to a sensor. As such, when a sensor detects a user's presence, it can be assumed that the user is located within proximity of the detecting sensor. As a further example, the user data can be processed to determine an identity of one or more of the users within the field of view of the sensor such as by facial recognition, gesture recognition, body heat analysis, behavioral analysis, eye tracking, head tracking, biometric analysis and/or other means of determining a user characteristic and or a change in a user characteristic. Other techniques can be used to identify a user or users, including direct user query and/or user input. As a further example, the user data can be compared to stored data in order to determine an identity of one or more of the users within the field of view of the sensor. In another aspect, characteristics and/or behavior of one or more users can be determined, such as by using the sensor. As an example, the user data can be processed to determine a user state, user characteristic and/or behavior of one or more of the users within the field of view of the sensor, such as by facial recognition, gesture recognition, body heat analysis, behavioral analysis, eye tracking, head tracking, biometric analysis and/or other means of determining a user characteristic and or a change in a user characteristic. In an aspect, the user characteristics, user state and/or user behavior determined can be used to generate and/or update one or more of the user profiles. In another aspect, determining a location of a user can comprise determining one or more of an audio characteristic, a video characteristic, and a reception characteristic relative to one or more of the plurality of interface devices.

In step 504, an interface device can be selected (e.g., automatically) based upon the determined location of the one or more users. In an aspect, when a user is within the field, e.g., field of view of the sensor, data relating to the presence and/or user state of the user can be communicated to the associated interface devices. Accordingly, the interface device can be automatically selected (e.g., activated, enabled, energized, etc.). As the user moves out of the field of a first sensor and into the field of a second sensor, the interface device associated with the second sensor can be automatically selected. In an aspect, a user can be detected by a plurality of sensors. As an example, information received or accessed by two or more of the plurality of sensors can be compared in order to determine the interface device to select. In another aspect, one or more interface devices can be configured to transmit audio, transmit video, receive audio, receive video, or a combination thereof. One or more of the plurality of interface devices can comprises a camera, a microphone, a speaker, near-field device, wireless device, a infra-red device, a proximity sensor, or a combination thereof.

In step 506, communication information can be routed (e.g., automatically) to the selected interface device. In an aspect, the communication information can comprise audio, video, or both. In another aspect, routing communication information can comprise establishing a communication session with the selected interface device.

Figure 6:
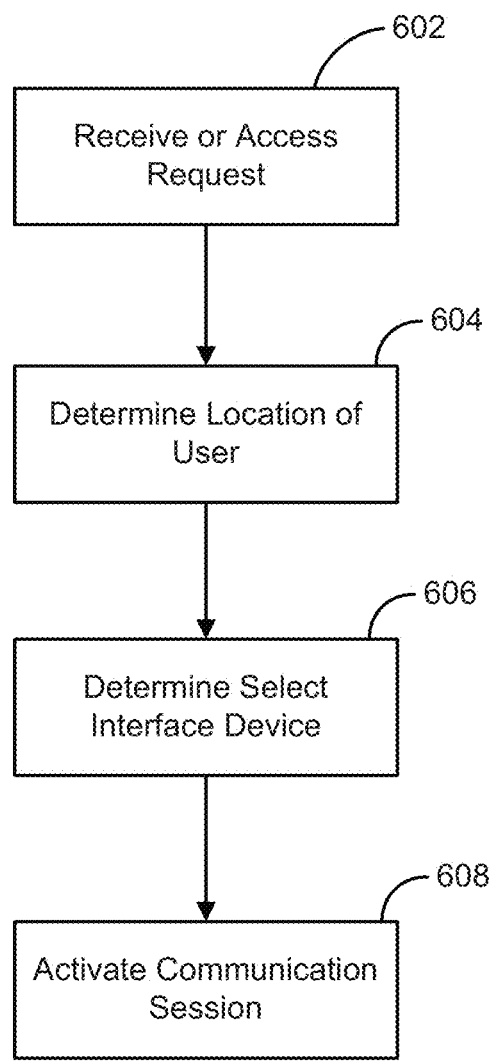
FIG. 6 is a flow chart of an exemplary method.

FIG. 6 illustrates an exemplary method for providing and controlling a user experience. In step 602, a request for a communication session can be accessed or received. In an aspect, the request for a communication session can comprise one or more of an incoming call and an outgoing call. As an example, the request for a communication session comprises one or more of an audio signal (e.g., vocal request), a wireless signal, and the like. As a further example, the request for a communication session can be received from a user device associated with the user.

In step 604, a location of one or more users can be determined. As an example, the location of one or more users can be determined in response to the request for a communication session. In an aspect, sensors can receive or access information (e.g., user data) relating to one or more users within the field of view of the sensor. As an example, the location of one or more users can be determined by relative proximity to a sensor. As such, when a sensor detects a user's presence, it can be assumed that the user is located within proximity of the detecting sensor. As a further example, the user data can be processed to determine an identity of one or more of the users within the field of view of the sensor, such as by facial recognition, gesture recognition, body heat analysis, behavioral analysis, eye tracking, head tracking, biometric analysis and/or other means of determining a user characteristic and or a change in a user characteristic. Other techniques can be used to identify a user or users including direct user query and/or user input. As a further example, the user data can be compared to stored data in order to determine an identity of one or more of the users within the field of view of the sensor. In another aspect, characteristics and/or behavior of one or more users can be determined, such as by using the sensor. As an example, the user data can be processed to determine a user state, user characteristic and/or behavior of one or more of the users within the field of view of the sensor, such as by facial recognition, gesture recognition, body heat analysis, behavioral analysis, eye tracking, head tracking, biometric analysis and/or other means of determining a user characteristic and or a change in a user characteristic. In an aspect, the user characteristics, user state and/or user behavior determined can be used to generate and/or update one or more of the user profiles. In another aspect, determining a location of a user can comprise determining one or more of an audio characteristic, a video characteristic, and a reception characteristic relative to one or more of the plurality of interface devices.

In step 606, an interface device can be selected (e.g. automatically) based upon the determined location of the one or more users. In an aspect, when a user is within the field, e.g., field of view of the sensor, data relating to the presence and/or user state of the user can be communicated to the associated interface devices. Accordingly, the interface device can be automatically selected (e.g., activated, enabled, energized, etc.). As the user moves out of the field of a first sensor and into the field of a second sensor, the interface device associated with the second sensor can be automatically selected. In an aspect, a user can be detected by a plurality of sensors. As an example, information received or accessed by two or more of the plurality of sensors can be compared in order to determine the interface device to select. In another aspect, one or more interface devices can be configured to transmit audio, transmit video, receive audio, receive video, or a combination thereof. One or more of the plurality of interface devices can comprise a camera, a microphone, a speaker, near-field device, wireless device, a infra-red device, a proximity sensor, or a combination thereof.

In step 608, a communication session can be activated (e.g., established, enabled, facilitated, etc.). In an aspect, activating the communication session can comprise toggling a state of the selected interface device such as an operational state. In another aspect, activating the communication session can comprise automatically tuning the selected interface device. As an example, activating the communication session can comprise automatically routing one or more of audio data and video data to and/or from the selected interface device. As another example, a communication session can be established between one or more interface devices at a first location and another interface device at a second location. As a further example, a communication session can be established via a network, such as a cellular network, IP network, wireless network, telephone network, and the like. In another aspect, a communication session can be configured based upon a location of a user. As an example, a communication session can be established between an interface device in a home office of a user premises and a communications network, such as a cellular network, IP network, telephone network, and the like. As a further example, the user can move from the home office into a living room of the premises. As such, the location of the user can be determined and the established communication session can be reconfigured to connect an interface device in the living room to the communications network.

In an exemplary aspect, the methods and systems can be implemented on a computing device such as computing device 701 as illustrated in FIG. 7 and described below. By way of example, server 110 of FIG. 11 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 701. The components of the computing device 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, personalization software 706, user data and/or personalization data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing device 701 typically comprises a variety of computer readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as personalization data 707 and/or program modules such as operating system 705 and personalization software 706 that are immediately accessible to and/or are presently operated on by the processing unit 703.

In another aspect, the computing device 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing device 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and personalization software 706. Each of the operating system 705 and personalization software 706 (or some combination thereof) can comprise elements of the programming and the personalization software 706. Personalization data 707 can also be stored on the mass storage device 704. Personalization data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g. a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 701 can have more than one display adapter 709 and the computing device 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and computing device 701 can be part of one device, or separate devices.

The computing device 701 can operate in a networked environment using logical connections to one or more remote computing devices 714a,b,c. By way of example, a remote computing device can be a personal computer, portable computer, smart phone, a server, a router, a network computer, a peer device or other common network node, and so on. Logical connections between the computing device 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of personalization software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining a location of a user;
   automatically selecting an interface device of a plurality of interface devices based upon the location of the user, wherein the selected interface device is configured to transmit and receive content; and
   automatically routing communication information to the selected interface device, wherein the communication information is associated with an established communication session.

2. The method of claim 1, wherein the selected interface device comprises a camera, a microphone, a speaker, a near-field device, a wireless device, an infra-red device, a proximity sensor, or a combination thereof.

3. The method of claim 1, wherein the determining the location of the user comprises determining a proximity of the user to one or more of the plurality of interface devices.

4. The method of claim 1, wherein the determining the location of the user comprises determining one or more of an audio characteristic, a video characteristic, and a reception characteristic relative to one or more of the plurality of interface devices.

5. The method of claim 1, wherein the determining the location of the user comprises receiving image information relating to the user.

6. A system comprising:
   a plurality of interface devices, wherein one or more of the plurality of interface devices is configured to transmit and receive content;
   a gateway in communication with the plurality of interface devices and a network, wherein the gateway is configured to facilitate a communication session between the network and one or more of the interface devices, wherein the gateway is configured to receive monitor information relating to one or more of the plurality of interface devices, to select a first interface device of the plurality of interface devices based upon the monitor information at a first time, and to select a second interface device of the plurality of interface devices based upon the monitor information at a second time; and
   a controller in communication with one or more of the plurality of interface devices and the gateway to activate a communication session between the network and the first selected interface device, and to transfer the communication session to the second selected interface device.

7. The system of claim 6, wherein one or more of the plurality of interface devices comprises a camera, a microphone, a speaker, a near-field device, a wireless device, an infra-red device, a proximity sensor, or a combination thereof.

8. The system of claim 6, wherein the gateway is further configured to route data between the network and one or more of the plurality of interface devices.

9. The system of claim 6, wherein the monitor information comprises information relating to a location of a user, a location of a user device, a quality of service (QoS), or a combination thereof.

10. A method comprising:
    receiving a request for a communication session;
    determining a first location of a user based on the request;
    selecting a first interface device of a plurality of interface devices based upon the first location of the user, wherein one or more of the plurality of interface devices is configured to transmit and receive content;
    activating the communication session between the first selected interface device and a network;
    determining a second location of the user;
    selecting a second interface device of the plurality of interface devices based upon the second location of the user; and
    transferring the communication session to the second selected interface device.

11. The method of claim 10, wherein the request for the communication session comprises an incoming call or an outgoing call.

12. The method of claim 10, wherein one or more of the plurality of interface devices comprises a camera, a microphone, a speaker, a near-field device, a wireless device, an infra-red device, a proximity sensor, or a combination thereof.

13. The method of claim 10, wherein the determining the first location of the user based on the request comprises determining a proximity of the user to one or more of the plurality of interface devices.

14. The method of claim 10, wherein the determining the first location of the user based on the request comprises determining an audio level relative to one or more of the plurality of interface devices.

15. The method of claim 10, wherein the determining the first location of the user based on the request comprises receiving image information relating to the user.

16. The method of claim 10, wherein the first location of the user is determined by one or more of the plurality of interface devices.

17. The method of claim 10, wherein activating the communication session comprises toggling a state of the first selected interface device.

18. The method of claim 10, wherein the activating the communication session between the first selected interface device and the network comprises automatically tuning the first selected interface device.

19. The method of claim 10, wherein the activating the communication session between the first selected interface device and the network comprises automatically routing one or more of audio data and video data to the first selected interface device.

20. The method of claim 10, wherein the network comprises one or more of a public switched telephone network, a wireless network, a cellular network, a distribution network, and an Internet protocol network.

* * * * *